(12) United States Patent
Schroeter et al.

(10) Patent No.: US 7,901,612 B2
(45) Date of Patent: Mar. 8, 2011

(54) METHOD FOR PLASTIC DEFORMATION OF POLYMERS BY ELECTROMAGNETIC RADIATION

(76) Inventors: Johannes Schroeter, Grosskarolinenfeld (DE); Florian Felix, Garmisch-Partenkirchen (DE)

( * ) Notice: Subject to any disclaimer, the term of this patent is extended or adjusted under 35 U.S.C. 154(b) by 1040 days.

(21) Appl. No.: 10/539,775

(22) PCT Filed: Dec. 11, 2003

(86) PCT No.: PCT/EP03/14058

§ 371 (c)(1),
(2), (4) Date: Aug. 5, 2005

(87) PCT Pub. No.: WO2004/058472

PCT Pub. Date: Jul. 15, 2004

(65) Prior Publication Data

US 2006/0033242 A1 Feb. 16, 2006

(30) Foreign Application Priority Data

Dec. 20, 2002 (DE) .............................. 102 60 137

(51) Int. Cl.
*B29C 47/78* (2006.01)
*H05B 6/00* (2006.01)
(52) U.S. Cl. .................. 264/476; 264/482; 264/492; 264/210.6; 264/211.11
(58) Field of Classification Search ........... 264/482, 264/476, 481, 492, 210.6, 211.11; 425/174.4, 425/384, 394, 407, 411
See application file for complete search history.

(56) References Cited

U.S. PATENT DOCUMENTS

| 4,115,280 | A | * | 9/1978 | Pratt, Jr. ................. 422/186.1 |
| 4,339,303 | A | | 7/1982 | Frisch et al. |
| 4,365,060 | A | | 12/1982 | Onda et al. |
| 5,096,654 | A | * | 3/1992 | Craggs et al. ............... 264/570 |
| 5,270,107 | A | * | 12/1993 | Gessner ..................... 442/356 |
| 5,275,056 | A | * | 1/1994 | Hamilton et al. .............. 73/794 |
| 5,780,524 | A | * | 7/1998 | Olsen .......................... 522/2 |
| 5,849,035 | A | | 12/1998 | Pathak et al. |

(Continued)

FOREIGN PATENT DOCUMENTS

WO 96/18493 6/1996

(Continued)

OTHER PUBLICATIONS

Grundlagen Und Bergriffsbeestimmugen, "Light Amplification by Stimulated Emission of Radiation", Bundesamt fur Strahlenschutz, Kontakt, 2003, XP-002283092.
Soren B. Nordin et al., "Note on molten cellulose produced in a laser beam", Swedish Forest Products Research Laboratory, 1973, pp. 609-610, Stockholm, Sweden.

(Continued)

*Primary Examiner* — Joseph S Del Sole
*Assistant Examiner* — Ryan Ochylski
(74) *Attorney, Agent, or Firm* — Arent Fox LLP

(57) ABSTRACT

According to the invention, a method for the plastic deformation of a polymer is provided, which is characterized in that the polymer is treated with electromagnetic radiation having a wavelength in the range from 0.8 to 100 μm with simultaneous action of pressure and shearing and thermal energy. By means of the method according to the invention, it is also possible to plastically deform polymers which have to date not been accessible to plastic deformation, such as chitin and in particular cellulose.

10 Claims, 1 Drawing Sheet

U.S. PATENT DOCUMENTS

| | | | | |
|---|---|---|---|---|
| 6,099,285 | A | * | 8/2000 | Kurihara et al. ............. 425/144 |
| 6,129,926 | A | * | 10/2000 | Fuisz ......................... 424/401 |
| 6,478,494 | B1 | * | 11/2002 | Eckl et al. .................... 401/96 |
| 6,479,001 | B1 | * | 11/2002 | Tsai et al. ................... 264/143 |
| 6,579,483 | B1 | * | 6/2003 | Vaders ....................... 264/126 |
| 2004/0151217 | A1 | * | 8/2004 | Yeik ............................ 372/25 |

FOREIGN PATENT DOCUMENTS

| | | |
|---|---|---|
| WO | 96/22867 | 8/1996 |
| WO | 98/14314 | 4/1998 |

OTHER PUBLICATIONS

Soren B. Nordin et al., "An Indication of Molten Cellulose Produced in a Laser Beam", Textile Research Journal, Feb. 1974, pp. 152-154.

Prof. Dieter Suter, "Laser: Light Amplification by Stimulated Emission of Radiation", Laserspektroskopie und Quantenoptik, Apr. 26, 2000, pp. 1-18, XP-002283093.

Von E.L. Back, "Cellulose bei hohen Temperaturen: Selbstvernetzung, Glasumwandlung und Schmelzen uter Einwirkung von Laserstrahlen", Cellulose bei hohen Temperaturen, 1973, pp. 475-483.

Schroeter, Johannes, et al., "Melting Cellulose", Cellulose 12: 159-165, 2005.

\* cited by examiner

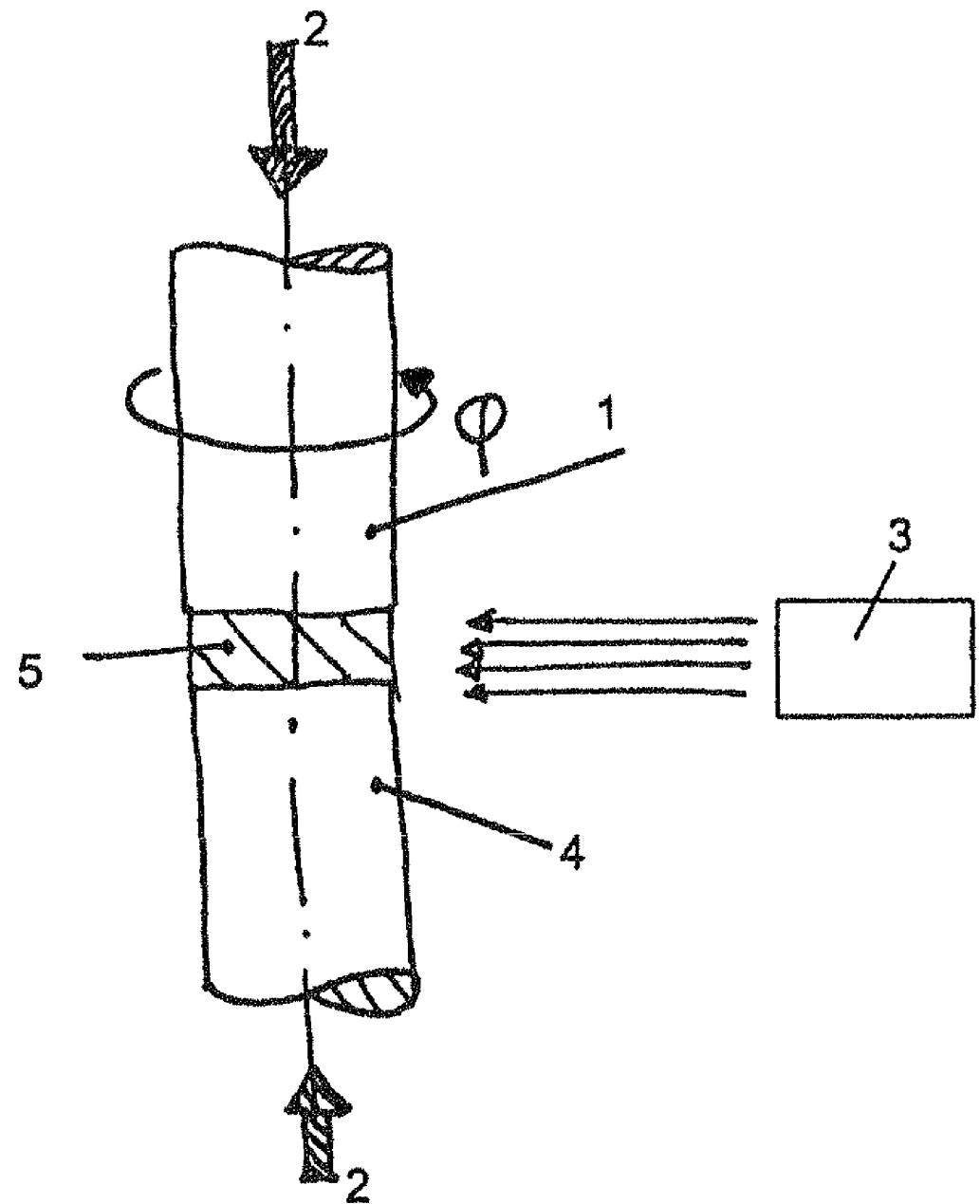

US 7,901,612 B2

METHOD FOR PLASTIC DEFORMATION OF POLYMERS BY ELECTROMAGNETIC RADIATION

This application is a national stage of PCT/EP2003/14058 filed Dec. 11, 2003, which claims priority to German patent application Ser. No. 102 60 137.2 filed Dec. 20, 2002, the entireties of which are hereby incorporated by reference.

1. Field of the Invention

The invention relates to a method for the plastic deformation of polymers, in particular of polymers which can be plastically deformed only with difficulty or not at all by conventional methods, such as polymers which form intermolecular hydrogen bridge bonds and in particular cellulose, chitin and polyvinyl alcohol. The invention also relates to an apparatus for carrying out the method, and plastically deformed cellulose and plastically deformed chitin which are obtainable by the method according to the invention.

2. Background of the Invention

Methods for the plastic deformation, in particular for the thermoplastic deformation, of polymers have long been known and are used to a considerable extent in industry. In addition to injection moulding methods, they also include in particular extrusion methods and methods for the production of man-made fibers from spinning mills. In these methods, polymers are melted using thermal energy. Infrared lamps and high frequency lamps (for example WO 96/22867) or microwaves (for example WO 98/14314) are also used as thermal energy sources, in addition to customary heating apparatuses. In these known methods for the melting of polymers, in which electromagnetic radiation is used, electromagnetic radiation is used unspecifically, i.e. in order to supply heat energy to the polymer system, and accordingly not monochromatic radiation but radiation in a broad wavelength range is used.

While the known methods can be used without problems in the case of most polymers, the thermoplastic processing and the melting of polymers which form strong intermolecular interactions, as occur in particular in the case of hydrogen bridge bonds, is possible only with great difficulties or is not possible at all.

Thus, it is known that cellulose does not melt but undergoes degradation above 180° C. under the action of oxygen (e.g. Ullmann's encyclopedia of industrial chemistry, 5th edition, Volume A5, 1986, 383). The reason for this is that the polymer chains of the cellulose are held by the secondary valency hydrogen bridge bonds in a fixed crystal lattice which has to be destroyed for the thermoplastic processing or the melting. At temperatures which would be required for thermal breaking of the secondary valency bonds, however, the polymer chain is irreversibly damaged. The thermal load capacity of the molecular chains of cellulose is accordingly not greater than the thermal stability of the cellulose lattice structure fixed by the secondary valencies from hydrogen bridge bonds (e.g. Das Papier [Paper], 44 (1990) 12, 617-624; TAPPI Journal 67 (1984) 12, 82/83; Journal of Applied Polymer Science, 37 (1989), 3305-3314). There is therefore a lack of a temperature interval, required for thermoplastic processing, between the temperature at which the intermolecular bonds break and the temperature at which the molecular chains are thermally damaged.

Although it is possible to process cellulose from a solution, for example to give films and fibers, such methods have a number of disadvantages. Thus, the rate for methods for polymer formation from a polymer solution is controlled by mass transfer (e.g. coagulation), and such methods are far inferior to the thermoplastic processes with respect to their rate. For example, cellulose fibers can be produced only at a rate of up to about 100 m/min, while thermoplastic material can be processed to fibers at rates of up to 8000 m/min. The result of this is a considerable cost disadvantage of the cellulose fibers. Furthermore, unusual and hazardous substances which give rise to high process costs have to be used as solvents for cellulose. Thus, the solvent carbon disulphide ($CS_2$) was initially used for cellulose but is readily flammable and explosive in vapor form and moreover has toxic properties. The N-methylmorpholine N-oxide (NMMO) which has been customary recently is also not without problems since it forms explosive peroxides at elevated temperatures (Kaplan, D. L.: Biopolymers from Renewable Resources, Berlin, Springer 1998, 79).

In the case of chitin, another natural polysaccharide, the processing situation is similarly difficult since it too tends to undergo thermal decomposition (at about 280° C.) rather than to melt (Kaplan, D. L.: Biopolymers from Renewable Resources, Berlin, Springer 1998, 108).

In the case of both natural products, attempts were made to solve the problem of the lack of thermoplastic processibility by a chemical modification. Thus, cellulose is esterified, for example, to cellulose nitrate, acetate, propionate or butyrate, which weakens the hydrogen bridges as intermolecular bonds. The method is effective but complicated and expensive. Moreover, one of the most important properties of the cellulose is its good biodegradability and, while the thermoplastic processibility of the cellulose is improved with increasing degree of substitution, the biodegradability decreases with increasing degree of substitution (Journal of Applied Polymer Science, 50 (1993), 1739-1746). Accordingly, chitin is frequently deacetylated to chitosan prior to industrial use. In addition to the disadvantages described above, the industrial deacetylation is moreover economically and ecologically problematic owing to the required amounts of alkali.

These difficulties which arise in the case of thermoplastic processing of cellulose and of chitin are particularly serious since both cellulose and chitin are synthesized in large amounts in nature and are the most important renewable polymers. According to literature data, cellulose is most frequent and chitin the second most frequent raw material on Earth (Kaplan, D. L.: Biopolymers from Renewable. Resources, Berlin, Springer 1998, 96).

In the case of other polymers which have intermolecular hydrogen bridge bonds, thermoplastic processing is on the other hand possible since the molecular chains are sufficiently thermally stable so that melting or thermoplastic deformation can take place at temperatures at which the secondary valency hydrogen bridge bonds break. A typical example of this is polyamide 6, in which the crystalline arrangement of the molecular chains melts at 230° C. owing to breaking of the hydrogen bridge bonds (Domininghaus, H.: Die Kunststoffe und ihre Eigenschaften [The plastics and their properties], 5th edition,. Springer, Berlin 1998, 616). Since the molecular chains of polyamide 6 may be exposed to temperatures up to 300° C. before they are thermally damaged, it is possible to melt or thermally deform polyamide 6. In practice, typical processing temperatures are 230° C. to 280° C.

Although thermoplastic processing is possible and is carried out on a large scale in the case of such polymers, the high temperatures which are required for this purpose are not advantageous. There is a need for a method by means of which these basically thermoplastically processible polymers can also be melted and subjected to plastic processing with the use of less energy.

The difficulties described in the case of the thermoplastic processing also occur, for example, in the case of polyvinyl alcohol.

BRIEF SUMMARY OF THE INVENTION

It is therefore an object of the invention to provide a novel method for the plastic deformation of a polymer, by means of which it is also possible in particular to process those polymers which, owing to strong intermolecular interactions, especially owing to hydrogen bridge bonds, can be melted or plastically deformed only with difficulty or not at all by conventional methods.

It is furthermore an object of the invention to provide an apparatus for carrying out such a method.

Finally, it is an object of the invention to provide the polymers cellulose and chitin, which have not been thermoplastically deformable to date, in a novel modification as formed on plastic deformation by the method according to the invention.

DETAILED DESCRIPTION OF THE INVENTION

These objects are achieved by a method for the plastic deformation of polymers, which is characterized in that a polymer is treated with electromagnetic radiation having a wavelength in the range from 0.8 to 100 µm with simultaneous action of pressure and shearing and thermal energy. An apparatus for carrying out this method is also provided, which comprises means for holding a polymer, means for exerting pressure on the polymer, means for shearing the polymer and means for supplying or removing heat and means for irradiating the polymer with electromagnetic radiation having a wavelength in the range from 0.8 to 100 µm.

Finally, the method also provides a polymer which contains cellulose or chitin and which can be prepared by the method according to the invention.

In the context of the present invention, stated percentages are based on percent by weight and molecular weights of polymers are based on number average molecular weights, unless stated otherwise.

In contrast to the methods of the prior art, as described, for example, in WO 96/22867 and Wo 98/14314, which use electromagnetic radiation and also infrared lamps (WO 96/22867) as heat sources and thus do not use electromagnetic radiation of a specifically defined wavelength but as a rule broadband electromagnetic radiation (this is most suitable for transmitting heat to a system), in the method according to the invention the polymer to be processed is selectively treated with electromagnetic radiation of a defined wavelength, i.e. substantially monochromatic radiation, the wavelength being selected from a range from 0.8 µm to 100 µm.

The following statements relating to processes in the polymer to be deformed explain the invention, but the invention is not limited to the assumed mechanisms.

The method according to the invention is based on the principle that the secondary valency bonds in polymers, in particular hydrogen bridge bonds, are specifically broken by a nonthermal method. For this purpose, the polymer is exposed to three different types of energy, namely energy from electromagnetic radiation of a suitable wavelength, mechanical energy and thermal energy. It is currently assumed that, in the method according to the invention, the hydrogen bridge bonds are weakened by mechanical and thermal energy. The energy introduced into the system via the electromagnetic radiation then results in the hydrogen bridge bonds being broken. As a result of the shearing acting on the polymer, the polymer is then plastically deformed. If the energy input is stopped and the plastic deformation ceases, the molecules form new hydrogen bridge bonds.

By means of the method according to the invention, it is possible to achieve thermoplastic deformation of polymers which have secondary valency bonds, in particular hydrogen bridge bonds, at temperatures which are substantially below the temperatures which are usually required for breaking secondary valency bonds, in particular the intermolecular hydrogen bridge bonds. Thus, by means of the method according to the invention, it is possible for the first time also to plastically deform polymers in which the intramolecular covalent bond energies are of the same order of magnitude (or even below this) as the energies of the intermolecular hydrogen bridge bonds, in particular cellulose and chitin. In particular, it is possible for the first time by means of the method according to the invention to plastically deform cellulose and to convert it into a transparent, clear film.

The invention makes use of the fact that secondary valency bonds, in particular hydrogen bridge bonds, absorb electromagnetic radiation having an energy in the infrared range. At these wavelengths, destruction of the covalent polymer bonds by the electromagnetic radiation is not to be feared. The electromagnetic radiation supplied should therefore have a wavelength of more than 800 nm, i.e. 0.8 µm. Firstly, high-energy radiation cannot be readily absorbed by the secondary valency bonds, in particular the hydrogen bridge bonds, and, secondly, the risk that the polymer will be chemically modified is increased by the use of high-energy radiation. On the other hand, according to the invention, the secondary valency bonds, in particular the hydrogen bridge bonds, are weakened by supplying mechanical energy and heat energy, so that, under certain circumstances, even electromagnetic radiation having a very low energy is sufficient to enable the method according to the invention to be carried out successfully. If, however, the wavelength of the electromagnetic radiation supply is longer than 100 µm, it is as a rule too low-energy for breaking the secondary valency bonds, in particular hydrogen bridge bonds. In the method according to the invention, electromagnetic radiation having a wavelength in the range from 0.8 µm to 100 µm is therefore used. The specifically chosen wavelength depends on the polymer to be processed and on the other reaction conditions, in particular on the energy introduced into the system by means of the shearing and on the possibly additionally supplied thermal energy.

The wavelength most suitable for the method according to the invention can be determined for any polymer and any experimental arrangement by a few routine experiments. For example, the wavelength range in which the secondary valency bonds of the polymer to be processed absorb can be determined by spectroscopic methods. Starting from the values thus determined, the wavelength which is optimum for carrying out the method according to the invention is then determined by suitable routine experiments.

Alternatively, quantum energies (photon energies) which would have to have electromagnetic radiation in order to break the secondary valency bonds can also be calculated from the bond energies of the hydrogen bridge bonds. From these calculations, the person skilled in the art obtains a starting value for the suitable wavelength of the electromagnetic radiation to be used in the method according to the invention, on the basis of which value and with simple routine experiments the wavelength most suitable for the plastic deformation of the chosen polymer can be determined.

As a rule, the radiation quanta may have a somewhat lower energy or the wavelength of the electromagnetic radiation used may be slightly longer than the result of the spectroscopic measurements and theoretical calculations described above since, in the method according to the invention, the secondary valency bonds are additionally weakened by mechanical and thermal load. Since, on increasing the bond distance r, the bond energies vary as $1/r^n$ (where n>1), even small extensions of the bond distances result in substantially lower bond energies. This corresponds to longer-wave and hence lower-energy radiation.

According to the invention, the polymer is thus treated with electromagnetic radiation of a defined wavelength which preferably corresponds to the bond energy of the secondary valency bonds of the polymer (in particular the hydrogen bridge bonds).

Electromagnetic radiation having a wavelength in the range from 1 µm to 50 µm is particularly preferably used according to the invention. Particularly preferred is electromagnetic radiation having a wavelength in the range from 1 µm to 20 µm and in particular of about 10 µm. Further preferred ranges of the suitable wavelength are from 0.8 µm to 50 µm, from 0.8 µm to 20 µm, from 0.8 µm to 15 µm and from 1 µm to 15 µm.

For practical reasons, it is expedient to use a laser for generating the electromagnetic radiation, which is preferred according to the invention. A carbon dioxide laser which provides radiation having a wavelength of 10.6 µm is particularly preferred.

The required quantity of energy (intensity of the electromagnetic radiation) depends to a very great extent on the specific apparatus in which the plastic deformation of the polymer is to be carried out and on the polymer throughput. Frequently, a beam intensity of only $10^2$ W/cm$^2$ or less is sufficient. However, it may be necessary or advantageous to use a higher beam intensity. The beam intensity is, however, preferably not higher than $10^5$ W/cm$^2$. Particularly preferred is a beam intensity of $5\times10^2$ W/cm$^2$ to $10^4$ W/cm$^2$ and especially of $10^3$ W/cm$^2$ to $10^4$ W/cm$^2$, e.g. about $10^3$ W/cm$^2$.

With the use of a laser, the beam may be pulsed or continuous, the beam preferably being pulsed.

The irradiation should be effected in a manner such that sufficient absorption of the radiation in the polymer takes place. The absorption is preferably in the range from 1 kJ/mol to 10,000 kJ/mol, more preferably from 5 kJ/mol to 1000 kJ/mol, in particular from 5 to 30 kJ/mol, e.g. about 20 kJ/mol.

The mechanical energy is introduced into the system in a manner known per se. Through shearing, the polymer is subjected to a mechanical shear stress by means of which the secondary valency bonds are additionally subjected to stress and are weakened. As soon as a sufficient number of secondary valency bonds break, the material is plastically deformed by the shear stress. The plastic deformation is thus a shear deformation. When the plastic deformation ceases, the molecules form new secondary valency bonds, e.g. hydrogen bridge bonds.

The shearing is preferably applied with a force or a torque which results in a shear rate in the range from $10^0$ s$^{-1}$ to $10^6$ s$^{-1}$, preferably from $10^1$ to $10^5$ s$^{-1}$, in particular from $10^1$ s$^{-1}$ to $10^3$ s$^{-1}$, for example about $10^2$ s$^{-1}$.

In addition to the shearing, the polymer is also subjected to a pressure which reduces the danger of fracturing of the material during processing and maintains a cohesive moulding material.

A pressure of 1 N/mm$^2$ to 5000 N/mm$^2$, preferably of 10 N/mm$^2$ to 1000 N/mm$^2$ and in particular of 50 to 500 N/mm$^2$ is preferably exerted on the polymer.

Pressure and shearing in cooperation introduce mechanical energy into the polymer system. The pressure is preferably also used for transmitting the shearing via the frictional effect into the polymer. According to the invention, this is preferably effected by means of two parallel ram surfaces between which the polymer is present and via which pressure is exerted on the polymer. A movement of the ram surfaces relative to one another under pressure generally results in transmission of shearing to the polymer.

Even in known apparatuses for the plastic deformation of polymers, such as, for example, extruders, pressure and shearing are exerted simultaneously on the polymer to be processed. According to the invention, any known apparatus which is suitable for the thermoplastic deformation or melting of polymer and by means of which pressure and shearing are transmitted to a polymer can be used after corresponding adaptation for carrying out the method according to the invention.

In the method according to the invention, it is furthermore important for thermal energy to act on the polymer. While thermal energy alone is not capable of breaking the secondary valency bonds (for example the hydrogen bridge bonds) of polymers, it, like mechanical energy, weakens the secondary valency bonds. A system on which pressure and shearing is exerted is simultaneously necessarily also supplied with thermal energy. In the method according to the invention, further thermal energy is supplied to the polymer additionally by the electromagnetic radiation. It is therefore frequently not necessary to supply thermal energy specially to the system. If this is required, it can be effected, for example, via a preheated material or by heating the moulds. Other methods for this purpose are known to the person skilled in the art.

Since the method according to the invention serves in particular also for plastically deforming polymers which must not be subjected to high temperatures, it may be necessary to remove thermal energy during the method if the thermal energy introduced into the polymer by shearing and radiation leads to a temperature increase such that the polymer to be processed is no longer stable. In this case, cooling should be effected during the method. In a preferred embodiment of the method according to the invention, the polymer to be processed is cooled during the processing by removal of heat.

According to the invention, the method is therefore preferably carried out in a manner such that the temperature of the polymer is monitored and is kept in a predetermined range by supplying or removing heat. The temperature which is suitable depends to a very great extent on the thermal stability of the polymer to be processed and on economic considerations. According to the invention, the temperature during the plastic deformation of the polymer is preferably from 20 to 280° C., the higher temperature range not being suitable for sensitive polymers but being suitable for use, for example, in the processing of polyamide 6. A range from 20° C. to 250° C. is more preferred, and thermally sensitive polymers, such as cellulose, are preferably processed at a temperature in the range from 20° C. to 120° C., more preferably from 50° C. to 100° C.

According to the invention, the method is preferably carried out at a temperature of $T \leq Tm/z-20°$ C., more preferably at a temperature of $T \leq Tm/z-40°$ C., more preferably at a temperature of $T \leq Tm/z-60°$ C., where Tm/z is the temperature at which the polymer melts or, if the polymer is decomposed before it melts, is the temperature at which the polymer decomposes. This temperature is, for example, 180° C. in the case of cellulose (this is a decomposition temperature), and 230° C. in the case of polyamide (the melting point).

The polymers which can be plastically deformed by the method according to the invention are not particularly limited. Although the method according to the invention is particularly advantageously suitable for the processing of thermally sensitive polymers which form strong intermolecular interactions (i.e. secondary valency bonds), in particular hydrogen bridge bonds, it is also possible to process polymers which are thermally stable, such as polyamide 6, or polymers which form weaker intermolecular interactions, by the method according to the invention, and it is entirely possible that there will be advantages in terms of process engineering, such as a lower processing temperature, compared with the conventional methods.

The term polymer as used in the context of the present Application includes individual polymers and blends of a plurality of polymers, in particular blends which contain one or more polymers which have strong secondary valency bonds, in particular hydrogen bridge bonds. Additives which influence the processing properties or application properties of the polymer may be added to the polymers. Such additives are known to the person skilled in the art, and, for example, glycerol, sorbitol or dyes may be mentioned here. The term polymer means both homopolymers and copolymers. Neither the average molecular weight of the polymer nor the molecular weight distribution is subject to particular restrictions. As a rule, the polymers have 20 or more monomer units, preferably 60 or more monomer units, in particular 80 or more monomers units, per polymer molecule. Particularly preferably, the polymers have about 300 to 44,000 monomer units per polymer molecule, particularly if the polymer is cellulose. According to the invention, the polymer to be processed particularly preferably comprises at least one polymer which can form intermolecular hydrogen bridge bonds, in particular a polysaccharide or a polyvinyl alcohol. Polymers which comprise at least one polymer which is cellulose, chitin, polyvinyl alcohol, a constitutional isomer of cellulose or a constitutional isomer of chitin, particularly preferably cellulose or chitin, are particularly preferably processed by the method according to the invention. According to the invention, the polymer particularly preferably comprises 10% or more, more preferably 30% or more, more preferably 60% or more, more preferably 75% or more, most preferably 90% or more, of cellulose or chitin.

According to the invention, the polymer also preferably comprises 70% or more, more preferably 80% or more, most preferably 90% or more, of a mixture of cellulose and hemicellulose, the proportion of hemicellulose preferably being 20% or less, more preferably 15% or less, most preferably 10% or less. It is also possible to use pulp which predominantly comprises cellulose (e.g. Römpp Chemie-Lexikon [Römpp Chemistry Lexicon], 9th Edition, Volume 6, 1992, 5113).

Cellulose and chitin are natural products which may frequently also comprise low molecular weight impurities without adversely affecting the carrying out of the method, but preferably not more than 50%, more preferably not more than 20%, most preferably not more than 10%. Customary natural impurities of cellulose are, for example, lignin and, in isolated cases, naturally occurring substances, such as, for example, silicic acids. According to the invention, substantially pure (preferably pure) cellulose, e.g. pulp, substantially pure (preferably pure) chitin, optionally together with suitable additives as mentioned above, are also preferably used as the polymer.

A particular advantage of the method according to the invention is that it can be combined with methods known per se for the thermoplastic deformation or melting of polymers, such as in particular extrusion methods, methods for the spinning of fibers and injection moulding methods. In extrusion methods, pressure and shearing are exerted on the polymer by the extruder itself. Extruders are usually also already equipped with an apparatus for supplying or for removing heat. During the extrusion, the polymer to be processed therefore as a rule need be additionally exposed only to electromagnetic radiation in order to carry out the method according to the invention. According to the invention, in particular films or fibers can be produced by the extrusion method.

According to the invention, for example, methods in which a polymer melt is produced with the aid of the method according to the invention and is then further processed in a customary manner, for example to give films or fibers, are likewise preferred.

Finally, the method according to the invention can be combined with an injection moulding method known per se. Here, as in the case of the combination with a spinning method, the polymer is first melted using the method according to the invention and then subjected to a customary injection moulding method. In order to prevent the polymer to be processed from being converted back into the unfavorable crystalline structure with formation of the originally present hydrogen bridge bonds, the injection moulding should be effected immediately after the polymer was melted by the method according to the invention.

According to the invention, an apparatus for carrying out the method according to the invention is also provided. The apparatus according to the invention which is suitable for carrying out the method according to the invention has means for holding a polymer, means for exerting pressure on the polymer, means for shearing the polymer, means for supplying or removing heat and means for irradiating the polymer with electromagnetic radiation having a wavelength of from 0.8 to 100 µm.

The means which exert pressure on the polymer are preferably also used for shearing the polymer. Particularly preferably, these means are two rams whose surfaces are movable relative to one another. An extruder screw is also preferred.

According to the invention, the means for irradiating the polymer with electromagnetic radiation are preferably a laser, as already described above.

Means for supplying and removing heat are known to a person skilled in the art. Such means are preferably heating and cooling collars which are mounted in a suitable manner on the apparatus according to the invention.

With the method according to the invention, it was possible for the first time to plastically deform polymers which contain cellulose and chitin. Hydrogen bridge bonds are broken thereby and form again in another manner after the deformation. The polymer which is deformed by the method according to the invention and contains cellulose or chitin, preferably in an amount of 10% or more, more preferably 30% or more, more preferably 60% or more, more preferably 75% or more, more preferably 90% or more, or consists exclusively of cellulose or chitin, therefore differs in its physical structure from the polymers which were used for the method. Although it is possible to process cellulose and chitin from a solution, reformation of the hydrogen bridge bonds likewise taking place, the structure of the polymers obtained from solution differs from the structure of the polymers deformed by the method according to the invention. Moreover, polymers which are processed from a solution inevitably acquire incorporated traces of solvents which are not present in the polymers deformed by the method according to the invention. The cellulose thermoplastically deformed by the method according to the invention and the chitin thermoplastically deformed by the method according to the invention, as defined above, are therefore novel compared with the known forms of cellulose and of chitin.

The invention is explained in more detail by the following example, with reference to Figure. The example is not limiting.

In Figure,

Reference numeral 1 designates a ram which can rotate about its longitudinal axis 2

Reference numeral 2 designates the longitudinal axis of the rams 1 and 4

Reference numeral 3 designates a $CO_2$ laser which can emit electromagnetic radiation having a wavelength of 10.6 μm Reference numeral 4 designates a stationary ram having the longitudinal axis 2 Reference numeral 5 designates the polymer to be deformed

EXAMPLE

Commercially available cotton wool fibers which comprise more than 90% of cellulose and more than 5% of hemicellulose (Ullmann's Encyclopedia of Industrial Chemistry, 5th Edition, 1986, 391) are compressed in a customary press to give cylinders having a diameter of 3 mm and a height of 2 mm. The fiber structure is retained. The pressure is 1178 N and the duration of pressing is 3 seconds. The polymer sample 5 substantially comprising cellulose forms thereby.

The polymer sample 5 is placed between two cylindrical rams 1 and 4 which lie on a common geometrical axis 2 of symmetry. The rams have a diameter of 3 mm and are pressed together with a force of 1178 N. They thus exert a pressure of 167 N/mm² on the polymer sample 5.

For carrying out the method, the ram 1 is first caused to rotate about its own longitudinal axis 2, in particular at a rotational speed of one revolution per second. The polymer sample is then exposed to electromagnetic radiation by means of the laser 3. The laser 3 is a $CO_2$ laser having a wavelength of 10.6 μm and a beam power of 280 W. The laser beam has an effective diameter of 5 mm at the processing site. This results in a beam intensity of $1.4 \times 10^3$ W/cm². The beam is pulsed with a pulse rate of 10 kHZ. The radiation lasts for 7 seconds. The rotation of the ram 1 in relation to the ram 4 and the pressure are maintained during this radiation time. Under the action of the laser beam, cotton wool fibers which project laterally between the rams burn.

During the entire method, the apparatus was cooled and was kept at a constant temperature of 100° C.

After the radiation and the rotation are switched off, the rams 1, 4 are moved apart. A thin, transparent disc of cohesive film-like material is present between the rams 1, 4. The film was clear and had no discoloration. The original fiber structure was converted into a cohesive continuum. No chemical modification of the cellulose took place.

The invention claimed is:

1. A method for the plastic deformation of a polymer that has intermolecular hydrogen bonds, the method comprising selecting electromagnetic radiation of one defined wavelength selected from the wavelengths in the range from 0.8 to 100 μm, and simultaneously treating the polymer with the selected wavelength of electromagnetic radiation and pressure and shearing and thermal energy, wherein the method is carried out at temperatures that are either below the temperature at which the polymer melts or, if the polymer decomposes before it melts, below the temperature at which the polymer decomposes, and wherein the wavelength of the electromagnetic radiation is selected so that it corresponds to the bond energy of the intermolecular hydrogen bridge bonds of the polymer and said wavelength of the electromagnetic radiation reversibly breaks said bonds.

2. The method according to claim 1, wherein the net thermal energy added to the polymer during the method is either positive or negative.

3. The method according to claim 1, wherein the electromagnetic radiation is laser radiation.

4. The method according to claim 3, wherein the electromagnetic radiation has a wavelength in the range from 1 to 50 μm.

5. The method according to claim 1, wherein the pressure acting on the polymer is in a range from 1 N/mm² to 5000 N/mm².

6. The method according to claim 1, wherein the shearing is applied with a force or a torque such that a shear rate in the range from $10^\circ$ to $10^6$ s$^{-1}$ acts on the polymer.

7. The method according to claim 1, wherein the polymer that has intermolecular hydrogen bridge bonds is a polysaccharide or polyvinyl alcohol.

8. The method according to claim 7, wherein the polymer that has intermolecular hydrogen bridge bonds is selected from the group consisting of cellulose, chitin, polyvinyl alcohol, a constitutional isomer of cellulose, a constitutional isomer of chitin and a blend of one or more of the above polymers.

9. The method according to claim 8, wherein the polymer that has intermolecular hydrogen bridge bonds is cellulose.

10. The method according to claim 1, wherein the deformed polymer is melted by means of electromagnetic radiation having a wavelength in the range from 0.8 to 100 μm under the simultaneous action of pressure and shearing and thermal energy and is then extruded and spun to give fibers or processed by injection moulding to give a moulding.

* * * * *